Figure 15:
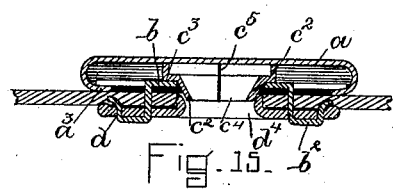

(No Model.) 2 Sheets—Sheet 1.
W. S. RICHARDSON.
FASTENING FOR GLOVES.
No. 382,904. Patented May 15, 1888.
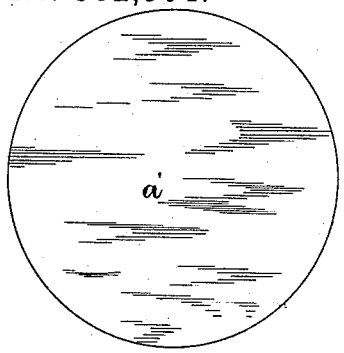 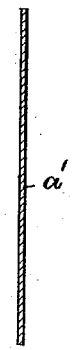 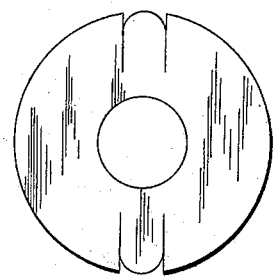 
Fig. 1.  Fig. 2.  Fig. 3.  Fig. 4.
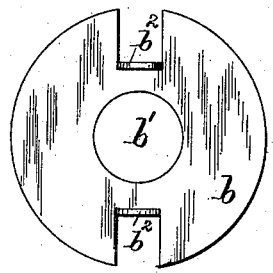 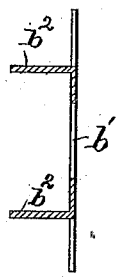 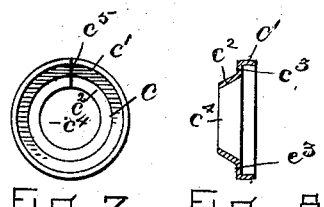 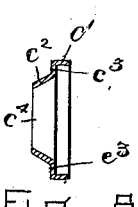
Fig. 5.  Fig. 6.  Fig. 7.  Fig. 8.
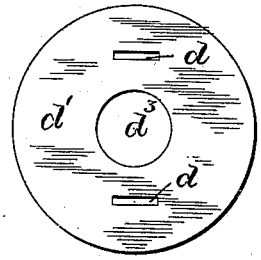 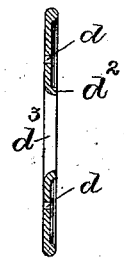 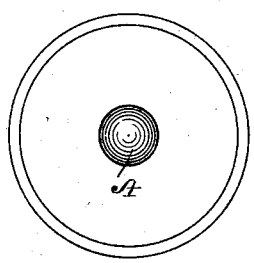 
Fig. 9.  Fig. 10.  Fig. 11.  Fig. 12.
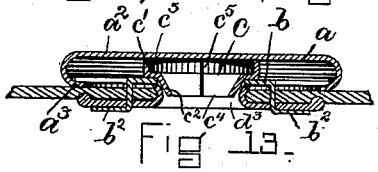 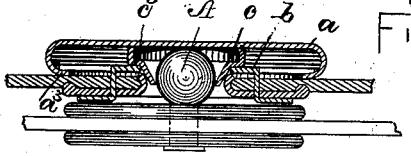
Fig. 13.  Fig. 14.
WITNESSES
J. W. Dolan.
E. P. Small.
INVENTOR
W. S. Richardson.
by his attys
Clarke & Raymond.

(No Model.) 2 Sheets—Sheet 2.

W. S. RICHARDSON.
FASTENING FOR GLOVES.

No. 382,904. Patented May 15, 1888.

WITNESSES.
J. W. Dolan.
E. P. Small.

INVENTOR.
W. S. Richardson.
by his atty
Clarke + Raymond.

UNITED STATES PATENT OFFICE.

WILLIAM S. RICHARDSON, OF BOSTON, MASSACHUSETTS, ASSIGNOR TO THE BALL AND SOCKET FASTENER COMPANY, OF NASHUA, NEW HAMPSHIRE.

FASTENING FOR GLOVES.

SPECIFICATION forming part of Letters Patent No. 382,904, dated May 15, 1888.

Application filed January 24, 1888. Serial No. 261,794. (No model.)

*To all whom it may concern:*

Be it known that I, WILLIAM S. RICHARDSON, of Boston, county of Suffolk, State of Massachusetts, a citizen of the United States, have invented a new and useful Improvement in Fastenings for Gloves and other Articles, of which the following is a full, clear, and exact description, reference being had to the accompanying drawings, forming a part of this specification, in explaining its nature.

The invention relates to the certain details of construction of the fastening which will hereinafter be described.

In the drawings, Figures 1 and 2 represent in plan and section the blank from which the cap or head of the fastening is made. Figs. 3, 4, 5, and 6 refer to the collet, to which the cap is secured by its edge. Figs. 7 and 8 show the ball or stud grasping device, which I have termed a "slit eyelet." Figs. 9 and 10 represent the under washer of the fastening. Figs. 11 and 12 show the ball, stud, or post member of the fastening. Fig. 13 represents the member of the fastening to which this invention relates secured in place to the material upon which it is used. Fig. 14 shows it in engagement with the ball, stud, or post. Figs. 15 to 21, inclusive, show modifications in construction, which will hereinafter be described.

The fastening comprises three principal parts: first, the cap $a$; second, the collet $b$; and, third, the slit eyelet $c$.

The cap $a$ is made, preferably, from a circular blank, $a'$, (see Figs. 1 and 2,) and when formed its upper surface, $a^2$, may be flat, as represented in Fig. 13, and its edge $a^3$ is folded or lapped upon the under surface of the collet. The collet $b$ is also made from a circular blank of metal. It has the central hole, $b'$, formed therein, the fastening prongs or extensions $b^2$, and it is adapted to hold the slit eyelet $c$ between its upper surface about the hole $b'$ and the under surface of the cap $c$. The slit eyelet has the enlarged upper section, $c'$, which preferably is annular in shape, and the downward-extending grasping-section $c^2$. This last-named part forms the jaw or grasping device, and it is represented as inclined from the shoulder $c^3$ downward and inward to its mouth $c^4$.

The shoulder $c^3$ bears upon the upper surface of the collet about the opening, and the section $c^2$ extends into the opening $b'$ and below the under surface of the collet. The eyelet also has a slit or side opening, $c^5$. The section $c'$ of the slit eyelet also serves as a stay in locating the position of the collet in relation to the cap.

The parts when assembled are secured to the material upon which the fastening is used, a hole having first been formed therein to receive the projecting end of the slit eyelet by passing the fastening-extensions $b^2$ through the material and holes $d$ in an under washer, $d'$. This under washer, preferably, has an upward-extending sleeve, $d^2$, about a central hole, $d^3$, which is somewhat larger than the lower end of the slit eyelet, and is adapted to enter the hole formed in the material and to act as a metal edge thereto. It must be of sufficient size to permit the lateral movement of the eyelet. The slit eyelet, it will be observed, is held between the collet and the cap, and is free to be moved a limited distance in relation to each of them, and is also free to be expanded laterally by the post, stud, or other member of the fastening.

Figure 16:
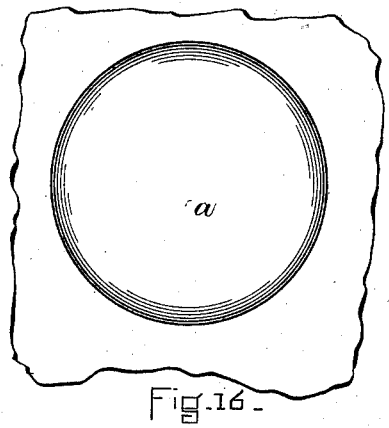

In Figs. 15 and 16 I have shown the under washer provided with additional holes, $d^3$, whereby the ends of the fastenings $b^2$ may be turned upward and be concealed and protected.

Figure 17:
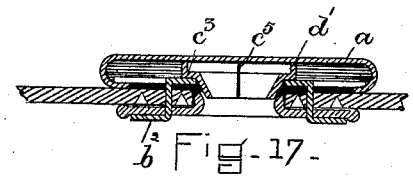
Figure 18:
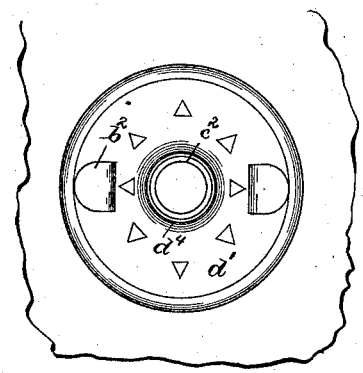
Figure 21:
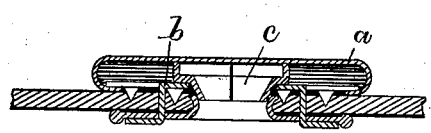

In Figs. 17 and 18 I have shown the collet as supplied with a number of downward-extending spurs or prongs, which enter the material and serve to prevent the fastening from being movable in relation thereto. These may be on the under washer.

Figure 19:
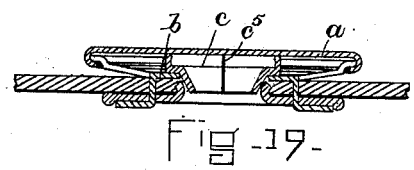
Figure 20:
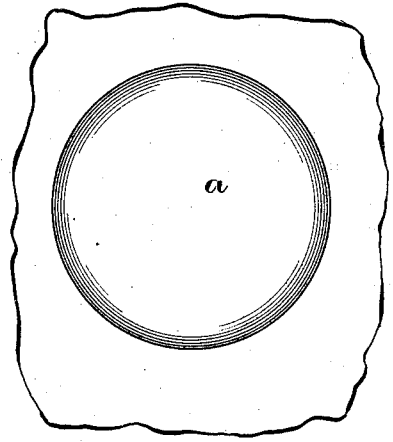

In Figs. 19 and 20 I have shown the collet as dish-shaped rather than as straight, in order to give the fastening more of the appearance of a flat button.

In use the fastening is brought into line with the post, stud, or ball A, so that upon their movement toward each other, or the movement of one in relation to the other, the ball, stud, or post is caused to enter the mouth $c^4$ of the slit eyelet and the edge thereof to yield sufficiently to permit the ball to enter the cavity or socket until its greater diameter has passed the lower edge of the slit eyelet, which then closes upon the ball or stud and holds it firmly in place.

Having thus fully described my invention, I claim and desire to secure by Letters Patent of the United States—

1. In the fastening for gloves and other articles, the combination of the cap $a$, the collet $b$, having the central hole, $b'$, and the slit eyelet $c$, held in the hole of the collet by the collet and the cap, as and for the purposes described.

2. The combination, in a fastening for gloves and other articles, of the cap $a$, the collet $b$, the slit eyelet $c$, and the prongs or fastenings $b^2$, integral with the collet, substantially as described.

3. The combination, in a fastening for gloves and other articles, of the cap $a$, the collet $b$, the slit eyelet $c$, held by the collet and cap, as specified, the fastening prongs or extensions $b^2$, extending from the outer section of the fastening, and the under washer, $d'$, having the holes $d$, as and for the purposes described.

4. The combination, in a fastening for gloves and other articles, of the cap $a$, the collet $b$, the slit eyelet $c$, held by the collet and cap, as specified, the under washer, $d'$, its sleeve $d^2$, and fastening prongs or extensions for uniting the collet and the under washer, substantially as described.

5. The combination of the cap $a$, the collet $b$, having the hole $b'$ and united to the cap, with the slit eyelet $c$, having the enlarged section $c'$, the shoulder $c^3$, and the grasping-section $c^2$, having the opening $c^4$, substantially as described.

6. In a fastening for gloves and other articles, the combination of the cap $a$, having a flat or substantially flat top, the collet $b$, made dish-shaped and united at its edge to the cap, with the slit eyelet $c$, held by its flange between the collet and cap, substantially as described.

7. The combination, in a fastening for gloves and other articles, of the collet $b$, having the short prongs, with the cap $a$ and the ball or stud receiving device $c$, supported between the collet and the cap, substantially as described.

WILLIAM S. RICHARDSON.

Witnesses:
F. F. RAYMOND, 2d,
E. P. SMALL.